March 27, 1962 J. A. BROWNING ETAL 3,027,447
ELECTRIC ARC TORCH
Filed Oct. 17, 1960 2 Sheets-Sheet 1

Inventors
James A. Browning
Kent W. Harrington

March 27, 1962 J. A. BROWNING ETAL 3,027,447
ELECTRIC ARC TORCH
Filed Oct. 17, 1960 2 Sheets-Sheet 2

Inventors
James A. Browning
Kent W. Harrington
by Wm O Moeser

United States Patent Office 3,027,447
Patented Mar. 27, 1962

3,027,447
ELECTRIC ARC TORCH
James A. Browning and Kent W. Harrington, Hanover, N.H., assignors to Thermal Dynamics Corporation
Filed Oct. 17, 1960, Ser. No. 63,019
14 Claims. (Cl. 219—75)

This invention relates to high temperature electric arc torches, and relates more particularly to an arc torch and a method of operating same whereby extreme economies and other important advantages over present arc torch devices are realized. In particular, the invention makes possible the use of very low gas flows and the production of plasmas considerably higher in temperature than currently possible.

Fundamentally, high-pressure arc torches utilize an electric arc to heat a stream of gas. The gas positions the arc column along the axis of a passage, said gas, in turn, being heated to extremely high temperatures by the arc. In some cases, as in the heating of conducting materials such as metals, the arc is projected through this passage, or nozzle, to strike the workpiece. Such a mode of operation is termed "transferred."

In other cases the arc impinges on the walls of the passage, only the heated gas being projected beyond the nozzle. This mode of operation is termed "non-transferred." The principles of this invention are applicable to both transferred and non-transferred modes of operation.

Heretofore, efforts in the development of arc torch devices have been concentrated on the production of high-velocity plasma streams. When a torch is used for the cutting of metals, a high velocity stream is necessary to sweep the molten metal from the kerf region. When a torch is used for metallizing, where fused droplets are projected against a surface, high velocity plasma streams are often required.

While many applications require a high-velocity plasma stream as in the examples cited, others can only be accomplished using streams having low levels of kinetic energy. For example, in fusion welding the plasma stream must have sufficiently low momentum to preclude adverse disturbance of the weld puddle.

In an experimental research program directed towards the development of a low velocity plasma stream the principles of this invention were discovered. It has been found that such desirable low velocity plasma jets can be obtained by the use of laminar gas flow. We define "laminar flow" to mean a flow of gas which is essentially undisturbed by turbulence. Such flow provides layers of gas molecules, all moving on substantially parallel lines, hence the term "laminar." It is essential that lines of motion having radial components (one result of turbulence) be suppressed or eliminated. Such a flow will also have low kinetic energy, and for a given nozzle diameter a much smaller quantity of gas flows per unit of time than in conventional devices.

In addition to the low kinetic energy of the jet, other remarkable and unexpected results occur. The allowable temperatures to which the plasma may be heated are much greater than heretofore possible. Also the noise level of operation is remarkably reduced. Whereas the noise level under conventional flow conditions is 115 db, under fully laminar flow conditions it is reduced to only 80 db.

It is to be emphasized that arc torches designed for high-velocity plasma stream production are not suitable for use in the laminar flow regions as taught herein. Prior torch designs provide for large gas flow rates and the establishment of high-velocity stabilizing gas flows predicated on injector passages across which substantial gas pressure drops are realized.

Our invention relies on the production of a laminar gas flow into the arc region. It is advantageous to provide uniform, low-velocity gas flow by providing special means to prevent the gas from impinging on structural members and surfaces, and so becoming turbulent.

A better understanding of the principles of this invention may be had from the following detailed description and by an examination of the drawings, in which—

FIGURE 1 is a cross-sectional view of a torch utilizing injector passages in accordance with the invention;

FIGURES 2a and 2b compare turbulent and laminar flow;

FIGURE 3 shows the use of a porous wall to distribute the gas flow;

FIGURE 4 provides for the use of "calming" screens;

Figure 1:
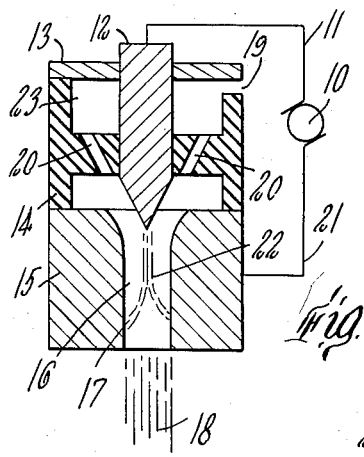

The arc torch of FIGURE 1 is shown in the "non-transferred" mode of operation. A conventional D.C. power supply, 10 (in this case arranged to provide direct polarity), supplies electrons to the cathode, 12, through a lead, 11. Cathode 12 is maintained in spaced relationship to a nozzle 15, by means of member 13. The member 13 and the nozzle 15 are electrically separated by means of an insulating section 14. Electrons flow from the tip of the cathode 12 to form the arc column indicated at 22, which extends into (or through) the passage 16. In FIGURE 1 the arc impinges on the interior surface of the passage 16 at the point 17. The electrical circuit is completed by the lead 21.

The flow of gas stabilizes the arc column substantially centrally at least part way through the passage 16. The mechanism of this stabilization will be discussed in more detail in the description of FIGURES 2a and 2b. The gas enters the torch through passage 19 and fills the annular chamber 23. The gas is then evenly distributed by the holes 20 to flow past the cathode tip into the passage 16. It is highly desirable that the streams of gas issuing from holes 20 are not disturbed by striking the cathode 12 or other torch members prior to entering passage 16. Tests have been conducted wherein the holes 20 were inclined at an angle providing for direct impingement of these multiple streams against the cathode 12. Operation was very noticeably more sensitive and the range of gas flows providing laminar entry conditions drastically reduced. It will be noted in FIGURE 1 that the holes 20 are arranged parallel to the side flanks of the cathode 12. We prefer to employ a plurality of holes equally spaced around the cathode 12.

The essence of this invention is to provide a smooth, laminar evenly distributed flow of gas into the arc region. It is the laminar nature of this flow which provides the novel features of our invention.

Figure 2A:
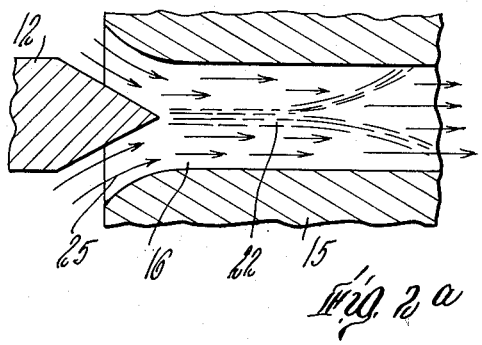
Figure 2B:
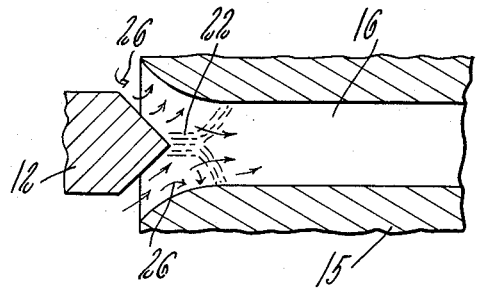

In FIGURES 2a and 2b laminar and turbulent flow conditions into the arc nozzle are compared. The laminar flow of FIGURE 2a is depicted by the arrows 25, which are drawn essentially parallel to the confining walls of the passage 25. In laminar flow, any radial motion of the gas molecules is reduced to an absolute minimum and the flow is fairly represented by the arrows shown.

FIGURE 2b shows the same torch structure, but now with a turbulent gas flow entering the passage 16. Superimposed on the parallel flow are turbulent eddies 26 which provide for a substantial radial component in the total flow pattern. FIGURES 2a and 2b are compared on the basis of the same gas flow and current level of operation.

The arc column 22 of FIGURE 2a extends well down the passage 16. This is due to the lack of a forced radial motion of such conducting particles as electrons and ions. These electrons and ions remain within the immediate region of the arc column and do not have any substantial motion in a radial direction. The arc column cannot impinge on the passage wall until an ionized path presents itself. As an ion drifts out of the arc region it comes into contact with the relatively cool sheath of gas, and is destroyed or neutralized. Thus, a two-fold effect is thought to exist to provide for arc containment along the passage axis. First, the only means by which an electron or ion can drift to the wall is by its own kinetic motion. Secondly, this radial path must extend through a cool gas sheath, the molecules of which are not moving with any appreciable radial component. It is thus seen that the arc circuit cannot be completed until the arc column grows in the radial direction and until the gas sheath itself becomes sufficiently heated, or sufficiently thin, to allow ionized particles to reach the wall.

In the case of turbulent flow, mass transfer by eddy action is caused. Hot, ionized masses of gas from the arc region move in a radial direction. In FIGURE 2b the action of these eddies is shown by the arrows 26. This forced mass transfer results in the formation of an adequately ionized path much more quickly than for the laminar flow case. The arc column, at low gas flows, extends only a short distance into the passage 16, and for the case shown in FIGURE 2b could well lead to the destruction of the torch nozzle by concentrated arc impingement.

To provide for stable operation under turbulent flow conditions it is necessary and has proven necessary in prior art devices to supply a relatively large flow of gas. The axial velocity of this increased gas flow "blows" the arc well along the passage length. It is by this latter mechanism that conventional arc torches operate. This sheer force counterbalances the effects of turbulence.

As shown in this discussion, for turbulent flow operation a point is reached as the gas is turned down at which operation becomes unsatisfactory. For a conventional non-transferred arc with a ¼ inch diameter nozzle passage, the minimum recommended gas flow is approximately 100 cubic feet per hour at a current flow of 700 amperes. Using nitrogen, the voltage under these conditions is 60 volts.

The same ¼ inch nozzle with the same cathode, but with provision for laminar inlet gas flow to the arc passage, allows for continuous operation with gas flows as low as 5 cubic feet per hour at 700 amperes. The voltage is reduced to 40 volts. The minimum gas flow rate is reduced to only 5 percent of its former value. Where the energy input per pound of nitrogen for turbulent flow is 15,000 B.t.u.'s (power to the torch less all heating losses), this figure can be raised to over 60,000 B.t.u.'s in the laminar flow case. This is a four-fold increase of specific enthalpy of the plasma gas.

Both visually and audibly, the operation under laminar conditions is readily distinguishable from its turbulent counterpart. At any given current level the turbulent case produces a short plasma jet. Atmospheric air rapidly mixes into the heated gas emanating from the nozzle passage. The jet length for the ¼-inch nozzle operating at 42 kw. is approximately 3 inches long. For the laminar case at 28 kw. the jet length is upwards to 18 inches long.

Where the turbulent jet makes a great deal of noise and requires the operator to wear ear protection, the laminar plasma jet can barely be heard. The laminar flame is "soft" in appearance. Also, the extremely high plasma temperature extends several times further away from the torch than in the turbulent case. For example, a tungsten rod is easily melted at a distance of 10 inches from the torch. For turbulent flow, all other conditions being the same, this distance is reduced to only 3 inches.

Figures 3, 5:
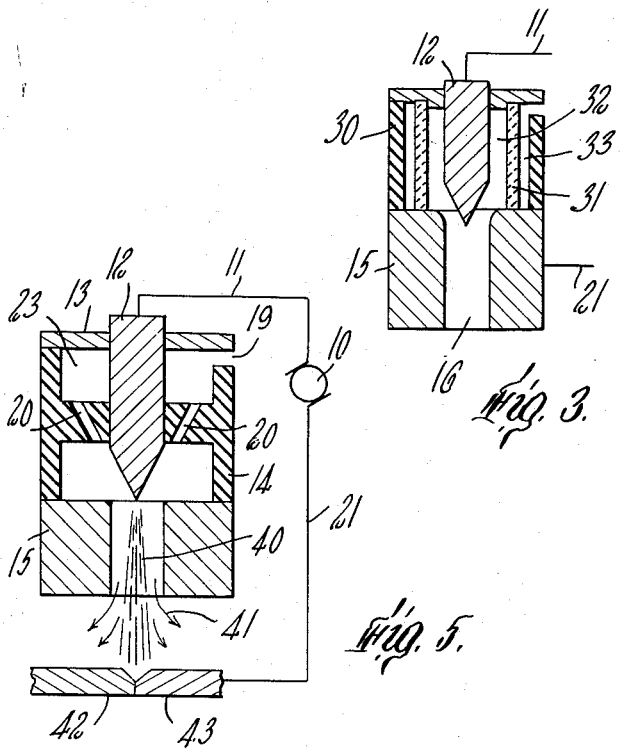
FIGURE 5 shows an arc torch in accordance with the invention in transferred-arc use.
Figure 4:
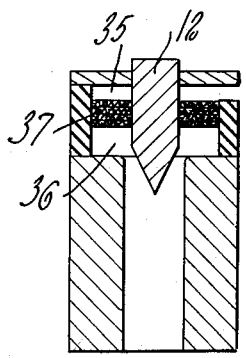

FIGURES 3 and 4 illustrates other means for producing a uniform and laminar flow. In FIGURE 3 a porous wall is provided as shown by the cylinder 31. Gas is introduced to the annular chamber 33 from which it diffuses through the material comprising cylinder 31 into the inner chamber 32. From this undisturbed condition the gas flows laminarly past the cathode 12 and into the nozzle passageway 16.

The porous tube in FIGURE 3 is made of non-conducting material, but for other configurations, where electrical insulation would not be required, this piece can be made of porous metal.

Another means for reducing the intensity of a turbulent gas flow is by the introduction of what may be termed calming screens 37 as shown in FIGURE 4. The gas is introduced into the annular chamber 35 contained above the screens 37 from whence it passes through the screens 37 into the chamber 36. Such screens can also be arranged cylindrically in the same manner as the porous tube of FIGURE 3.

Other means may be utilized to provide the laminar flow required in this invention. A measure of the degree of turbulence of a gas flow is given by the Reynold's number $N_r$. This dimensionless quantity is determined by:

$$N_r = \frac{V d p}{u}$$

where
$V$ = flow velocity
$d$ = diameter of passage
$p$ = density of gas
$u$ = viscosity of gas Laminar flow for fully developed pipe flow exists below $2,200 N_r$. A transition region between laminar and turbulent flow exists between 2,200 and about 5,000. Fully turbulent pipe flow exists above $5,000 N_r$. It is seen that laminar flow is achieved for any one nozzle diameter and gas type by reduction of the flow velocity V. Thus, for pipe flow only relatively low gas velocities are possible.

As the flow paths contained within a typical torch body are usually quite short, it is not probable that laminar pipe flow conditions are achieved. Thus, the use of alternate calming means is required. Of particularly high value (in those cases where higher gas velocities from the nozzle are desirable, but where laminar flow is nonetheless required) is the use of the Mach-Hebra nozzle which allows for Reynold's numbers to 40,000 and higher. High velocity at low noise levels can be achieved in this way.

Whereas the mode of operation discussed in detail has concerned non-transferred arc configurations, the application of our laminar flow principles to the transferred arc mode is also of great practical significance. FIGURE 5 illustrates the use of such a transferred arc in a welding application. Pieces 42 and 43 to be weld-joined are placed before the torch. The arc 40 transfers to these pieces, the arc circuit being completed through lead 21. The plasma effluent 41 has little persistence of direction and lacks undesirable momentum which would disturb the weld puddle.

Figure 6:
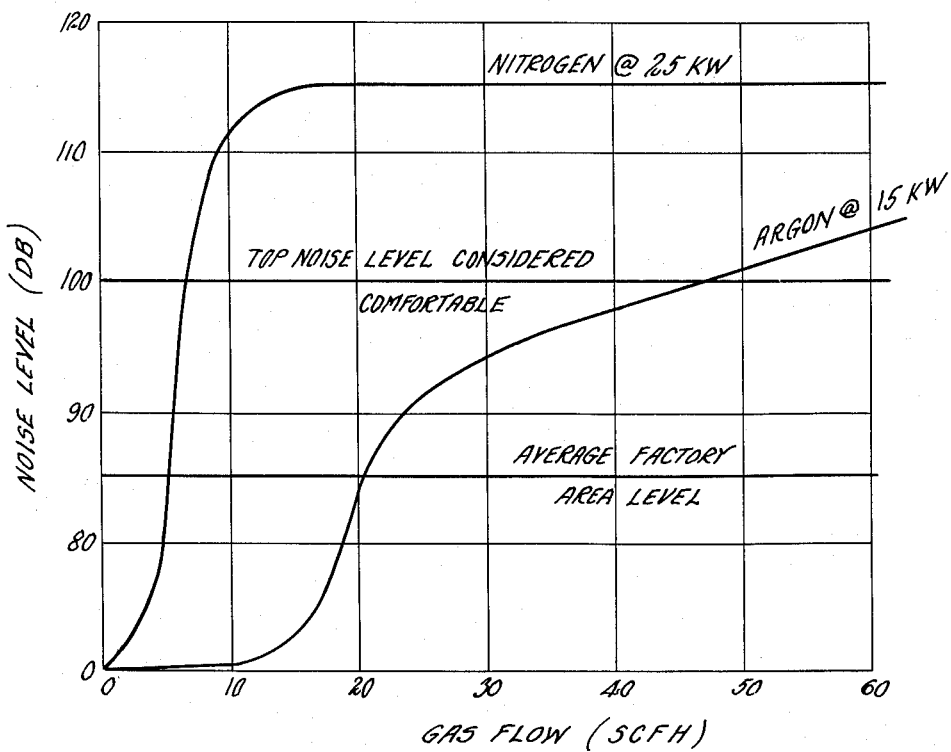
FIGURE 6 is a graph plotting the noise level against gas flow rate.

Evidence of whether a torch is operating under the laminar flow conditions of this invention or under turbulent conditions of conventional arc torches is readily given by the resulting noise level of operation. FIGURE 6 is a graph drawn from actual test results. At 100 s.c.f.h. of nitrogen the noise level is 115 db. This high level is maintained until the gas flow is reduced to below 15 s.c.f.h. Below 15 s.c.f.h. the noise level falls dramatically until at 5 s.c.f.h. it is below that of the average factory area. Surprisingly, in addition to this drop, the plasma jet extends greatly in length. Argon shows somewhat different characteristics but a similar reduction in noise level.

The principles of this invention are based on the provision of laminar gas flow into the arc passage as well as the maintenance of laminar flow in the plasma jet produced. For reasons not fully understood, there is a range of current flow for a given nozzle passage diameter and inlet gas flow which produces optimum results; that is, the lowest sound level of operation for that particular combination. The current is best maintained between 300 and 500 amperes for a 3/16 inch nozzle, while these values increase to between 500 and 800 amperes for a 5/16 inch nozzle. On either side of these optimum current flows the noise level increases somewhat, or acquires annoying harmonics.

The practical advantages of the laminar plasma jet will be evident to all skilled in this art. Welding for the first time can be accomplished by a "flame" (non-transferred arc) having controllable characteristics. The flame temperature can be varied simply by changing the power level. A fully inert atmosphere can be provided for shielding the weld zone by the use of argon and other noble gases. Heat transfer rates many times that of the oxy-acetylene flame are achieved, and at far lower jet momentums.

Where a powdered material is introduced into the torch to be fused, it is often difficult to accomplish the purpose with a high velocity plasma jet. This is usually due to the short transit time of the individual particle in the heating zone. Laminar plasma streams provide a much longer dwell time and allow a reliable, inexpensive means for fusing or spheroidizing all types of materials.

Crystal growing by means of the Verneuil principle is well adapted to this low velocity plasma stream since the liquid surface on the bol is disturbed a minimum amount.

Figure 7:
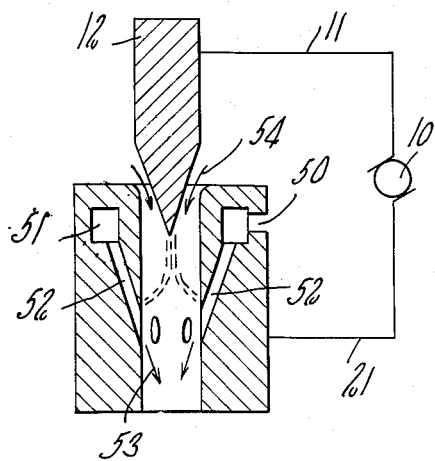
FIGURE 7 shows an alternate form of torch operation.

It is to be understood that in practicing our invention the arc column is stabilized by gas action. Whereas gas is usually provided under a small pressure head to flow along the cathode and into the nozzle, we have found that such delivery is not actually essential to torch operation. A torch operates satisfactorily (as shown in FIGURE 7) where atmospheric air, or other gas, is aspirated by the action of the gas jets 53. The gas, in this case, is introduced under pressure into the manifold 51 through passage 50. Jets 53 result from gas expansion through holes 52. Such a configuration offers a convenient means for introducing substances into the plasma jet. A powder, for example, can be introduced with the forced gas flow issuing as the streams 53. The criterion of operation of this torch design is determined by the fact that the aspirated flow 54 is laminar.

In many cases where higher power levels are desirable it is advantageous to provide for higher arc voltages. Such higher voltages may be provided by use of a first passage which is electrically neutral and a second nozzle providing a passage coaxial with and in series with the first passage. The second nozzle serves as the other electrode. This electrically "floating" midpassage provides a longer distance from the cathode to the first available anode surface.

Whereas this discussion has been limited to cases using D.C. direct polarity, this invention is equally adaptable to reversed polarity and A.C. operation.

While I have described particular embodiments of my invention, variations within the spirit and scope of the appended claims may readily occur to persons skilled in the art.

We claim:

1. In an arc torch having a nozzle passage, the method of stabilizing an arc in said passage comprising introducing gas into said passage under laminar flow conditions.

2. In an arc torch having a first chamber and a nozzle passage, the method of stabilizing an arc in said passage comprising introducing a gas under pressure to said chamber, and causing said gas to flow from said chamber into said passage under substantially laminar conditions.

3. An arc torch comprising, a cathode, an anode nozzle defining an elongate arc passage extending from said cathode, means for establishing an arc between said cathode and said anode, and means providing a laminar flow of plasma forming gas into said arc passage, whereby said arc extends at least part way into said passage.

4. An arc torch comprising, a cathode, an anode nozzle defining an elongate arc passage extending from said cathode, means for establishing an arc between said cathode and said anode, a chamber to receive plasma forming gas under pressure, and a porous member between said chamber and said arc passage through which said gas may flow laminarly around said cathode and into said passage.

5. An arc torch comprising, a cathode, an anode nozzle defining an elongate arc passage extending from said cathode, means for establishing an arc between said cathode and said anode, a chamber to receive plasma forming gas under pressure, and a plurality of apertures around said cathode through which said chamber communicates with said passage, said apertures being disposed to introduce said gas into said passage under laminar flow conditions.

6. An arc torch comprising, a cathode, an anode nozzle defining an elongate arc passage extending from said cathode, means for establishing an arc between said cathode and said anode, a chamber to receive plasma forming gas under pressure, and at least one meshed screen member between said chamber and said passage whereby turbulence of said gas is reduced before it flows into said said passage.

7. An arc torch according to claim 3, in which an electrically neutral member extending the length of said arc passage is placed between said cathode and said anode nozzle.

8. An arc torch according to claim 4, in which an electrically neutral member extending the length of said arc passage is placed between said cathode and said anode nozzle.

9. An arc torch according to claim 5 in which an electrically neutral member extending the length of said arc passage is placed between said cathode and said anode nozzle.

10. An arc torch according to claim 6 in which an electrically neutral member extending the length of said arc passage is placed between said cathode and said anode nozzle.

11. An arc torch having an electrode, a nozzle having an elongate passage extending from said electrode, an external workpiece, means for establishing an arc stream between said electrode and said workpiece through said passage, and means for introducing gas to flow laminarly through said passage.

12. An arc torch for raising solid particles to their fusion temperature and projecting them as an effluent, comprising, two electrodes, one of which defines a nozzle having an elongate arc passage extending from the other electrode, means for establishing an arc column between said electrodes, means for introducing gas under pressure to flow under laminar conditions in a sheath around said other electrode and through said passage, and means for introducing said particles into said passage to be carried by said gas along said passage.

13. An arc torch according to claim 12, in which an electrically neutral member extending the length of said arc passage is placed between said electrodes.

14. In an arc torch having a first electrode and a nozzle electrode defining an arc passage extending from said first electrode, means for establishing an arc between said electrodes, a source of gas at substantially atmospheric pressure opening around said first electrode, and means for introducing gas under higher pressure into said passage remote from said first electrode and at an acute angle to the axis of said passage, whereby gas is aspirated from said source into said passage.

References Cited in the file of this patent

UNITED STATES PATENTS

| | | |
|---|---|---|
| 1,587,197 | Southgate | June 1, 1926 |
| 2,544,711 | Mikhalapov | Mar. 13, 1951 |
| 2,770,708 | Briggs | Nov. 13, 1956 |
| 2,806,124 | Gage | Sept. 10, 1957 |